Aug. 9, 1932.   G. PIELSTICK   1,871,340

FUEL VALVE

Filed April 28, 1931

Inventor
Gustav Pielstick
by Maréchal & Noé
attys

Patented Aug. 9, 1932

1,871,340

UNITED STATES PATENT OFFICE

GUSTAV PIELSTICK, OF AUGSBURG, GERMANY, ASSIGNOR TO MASCHINENFABRIK AUGSBURG-NURNBERG A. G., OF AUGSBURG, GERMANY, A CORPORATION OF GERMANY

FUEL VALVE

Application filed April 28, 1931, Serial No. 533,567, and in Germany May 8, 1930.

This invention relates to fuel injection valves.

One object of the invention is the provision of a fuel injection valve for internal combustion engines having provision for connection to an injection pipe by means of an attachment member movably supported on the valve body.

Another object of the invention is the provision of a fuel injection valve of the character mentioned, having a conical extension member on the valve body and an attachment member adapted to be connected to an injection pipe, the attachment member being rotatably supported on the extension to facilitate connection to an injection pipe of a comparatively rigid nature.

Other objects and advantages of the invention will be apparent from the following description, the appended claims, and the accompanying drawing, in which—

Figure 1:
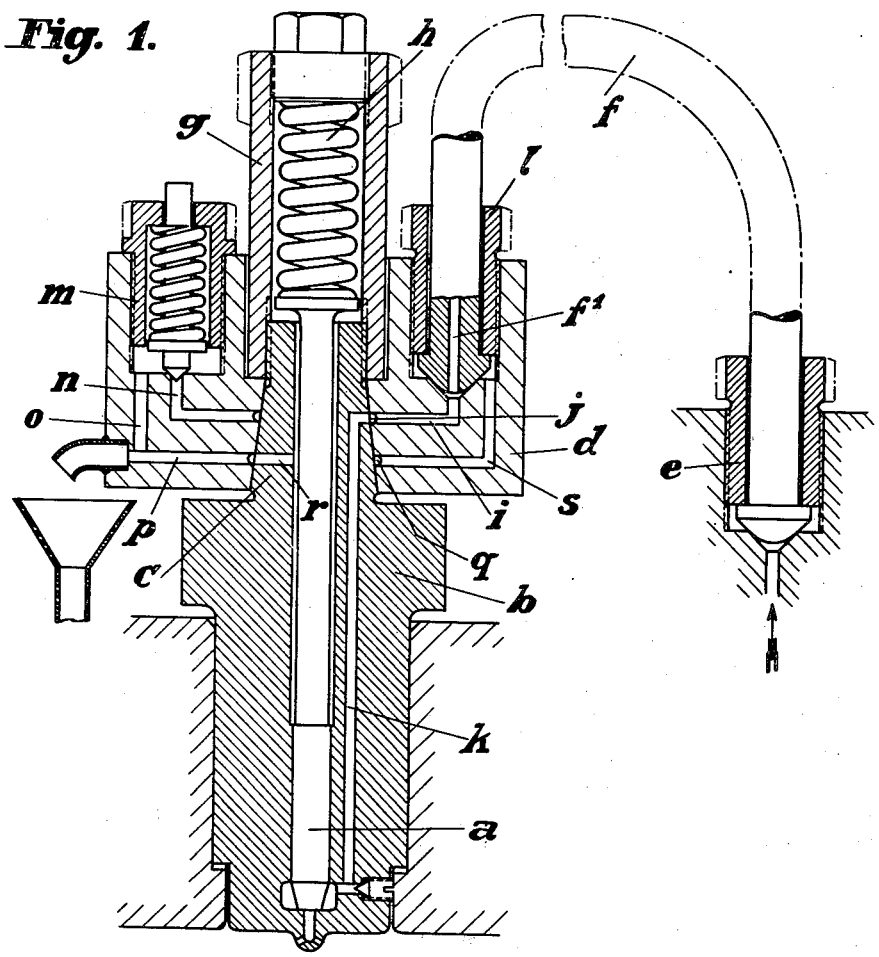
Figure 2:
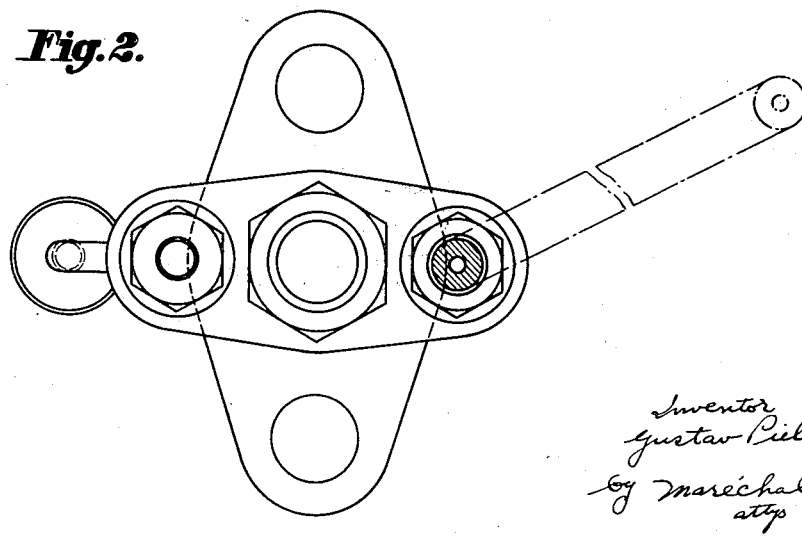

Fig. 1 is a longitudinal sectional view through a fuel injection valve embodying the present invention; and Fig. 2 is a top plan view thereof.

Injection pipes or leads extending from the fuel pump to the injection valve, especially in high speed combustion power machines, in which the fuel is supplied from a fuel pump or the like as in Diesel engine construction, are often of a comparatively rigid character, having thick walls to withstand the high strains and severe requirements. Injection pipes of such character are connected with difficulty to the injection valves unless they are of the exact required length. If their length varies somewhat from the required amount they do not fit exactly with the injection valve and due to the thick walls of the injection pipe they cannot be bent readily.

In accordance with the present invention these difficulties are avoided by the provision of a valve having a conical extension on the main valve body on which fits an attachment member adapted to be connected to the injection pipe. Irregularities in the length of a thick walled injection pipe are thus provided for by a movement of the attachment member on the valve body. The connection of the injection pipe with the fuel pump is a rotatable one so that the injection pipe may be readily moved.

To provide for rotation of the attachment member on its seat, an annular groove is provided in the attachment member or the extension member of the valve seat, preferably the former as shown in the drawing so that the passages in the valve body extension and in the attachment member may communicate regardless of the position of the attachment member. In accordance with the present invention a safety valve is also provided in the attachment member for the automatic relief of the pressures at a predetermined value for releasing an overcharge of fuel. Leak passages may also be connected to the lead-off passage of the safety valve to direct the oil or fuel that might accumulate in the valve body and also at the connection between the attachment member and the injection pipe, returning the fuel to the source of supply.

Referring now to the drawing, like numerals designating similar parts in the various views, the fuel injection valve is herein shown as a needle valve the needle $a$ of which is contained in the valve body $b$. The latter is provided with a conical extension $c$ at its upper end. The conical seat of this extension fits in a conical seat in the attachment member $d$ which is held in any desired position upon the extension by means of the casing $g$ which is provided with screw-threads engaging the valve body. This casing $g$ contains the spring $h$ of the needle valve. On the attachment member $d$ is a coupling receiving the injection pipe $f$ leading to the fuel pump on which it is rotatably fixed.

The attachment member $d$ is provided with a fuel passage $i$ which communicates with the opening $f'$ of the injection pipe. The fuel passage $i$ also connects with an annular groove $j$ provided in the seat surface of the attachment member. The channel $k$ is connected to the groove $j$ which leads fuel to the injection nozzle or to the inside of the valve body. By reason of this construction, a thick walled injection pipe that is a little too short to fit the fuel injection valve is very readily connected in place, merely by releasing the clamping nut e and party unscrewing the casing g, permitting the attachment member to be shifted on its seat sufficiently to accurately fit the injection pipe. This attachment having been completed, the clamping elements e, l and g are securely tightened.

A safety or relief valve m is also provided on the attachment member d, this safety valve being in communication with the annular groove j through the passage n. A pipe o leads from the outlet side of the safety valve conducting the fuel that passes through the valve to an outlet opening above a suitable container that may return the fuel to the source of supply. The passage o is also connected to a second annular groove q on the attachment member, through another channel or passage p. Channel r leads from the groove q to the needle chamber above the controlling element a, and another channel s leads from the groove q to the connection or leak chamber provided at the coupling for the fuel pipe f. By means of these channels s, r, o and p, fuel leakage which has accumulated in the needle chamber during operation or accumulated in the leak chamber of the injection pipe coupling may be led off to the container which returns the fuel to the source of supply.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A fuel valve for the injection of fuel in an internal combustion engine of the character described comprising a valve body having a conical extension member, and an attachment member adapted to be adjustably connected to said extension member, said attachment member having a conical seat rotatably supported by said extension member and having provision at a point spaced from the axis of symmetry of said conical seat for attachment to an injection pipe, said valve body and attachment member having cooperating fluid passages for the supply of fuel to the engine.

2. A fuel valve for the injection of fuel in an internal combustion engine of the character described comprising a valve body having an extension member, and an attachment member adapted to be connected to and supported by said extension member, said attachment member having a seat rotatably supported by said extension member and having a coupling at a point spaced from the axis of symmetry of said seat adapted to be attached to an injection pipe, said attachment member and said extension member having cooperating fuel passages one being an annular channel which connects with the other passage in any position of the attachment member on the extension member.

3. A fuel valve for the injection of fuel in an internal combustion engine of the character described comprising a valve body having a conical extension member, and an attachment member adapted to be connected to and supported by said extension member, said attachment member having a conical seat rotatably supported by said extension member and having provision for attachment to an injection pipe, said valve body and attachment member having cooperating fluid passages for the supply of fuel to the engine, and means for securing said attachment member to said extension member in any position of the attachment member.

4. A fuel valve for the injection of fuel in an internal combustion engine of the character described comprising a valve body having a conical extension member, and an attachment member adapted to be connected to said extension member, said attachment member having a conical seat rotatably supported by said extension member and having a coupling adapted to be attached to an injection pipe, a safety valve provided in said attachment member, said members having cooperating fluid passages for the supply of fuel to the engine, and a connection from said passages to said safety valve provided in said attachment member.

5. A fuel valve for the injection of fuel, of the character described, comprising a valve body having a conical extension member, an attachment member rotatably supported on said extension member and having a conical seat fitting thereon, coupling means provided on said attachment member at one side of the axis of said conical extension member, and a safety valve provided in said attachment member at the other side of said axis, said extension member and said attachment member having cooperating passages communicating with said safety valve and with one another.

6. A fuel valve for the injection of fuel, of the character described, comprising a valve body having an extension provided with a seat, an attachment member rotatably supported by said extension member and having a seat cooperating therewith, a coupling on said attachment member adapted to be connected to an injection pipe, cooperating passages in said members for the supply of fuel from the injection pipe to a chamber in said valve body, a safety valve provided in said attachment member, a passage from one side of said safety valve to said cooperating passages, and a connection from the outlet side of said safety valve providing for relief of the fuel and connected to the interior of the valve body and to said coupling.

7. A fuel valve for the injection of fuel in an internal combustion engine of the character described comprising a body portion adapted to be fixed to the engine, an attachment member, said body portion and said attachment member having cooperating seats providing a rotatable support of the attachment member on the body portion and providing for movement of the attachment member about the longitudinal axis of said body portion, means on said attachment member spaced from the axis of symmetry of said seats for attaching an injection pipe, said body portion and attachment member having cooperating passages for the supply of fuel to the engine.

In testimony whereof I have affixed my signature.

GUSTAV PIELSTICK.